| United States Patent [19] | [11] Patent Number: 4,527,681 |
|---|---|
| Sommer | [45] Date of Patent: Jul. 9, 1985 |

[54] VARIABLE SPEED DRIVE UNIT WITH GRADUATED INCREASING AND DECREASING SPEED PROFILE

[75] Inventor: Gordon M. Sommer, Boca Raton, Fla.

[73] Assignee: Sommer Company, Warren, Mich.

[21] Appl. No.: 620,383

[22] Filed: Jun. 13, 1984

Related U.S. Application Data

[63] Continuation of Ser. No. 327,716, Dec. 4, 1981, abandoned.

[51] Int. Cl.³ .............. F16D 25/061; F16D 25/063; F16D 25/14
[52] U.S. Cl. .................. 192/52; 192/70.12; 192/70.13; 192/85 AA; 192/86; 192/113 B; 165/103; 188/72.4; 91/48; 91/52; 92/59
[58] Field of Search .......... 192/85 AA, 113 B, 70.12, 192/52, 86, 85 R, 70.13; 165/103, 35; 60/548; 188/72.4, 72.5; 91/52, 48; 92/59

[56] References Cited

U.S. PATENT DOCUMENTS

| 192,273 | 6/1877 | Nash | 91/52 |
|---|---|---|---|
| 1,138,099 | 5/1915 | Fornaca | 192/86 |
| 2,398,997 | 4/1946 | Berry et al. | 91/48 |
| 2,969,131 | 1/1961 | Black et al. | 192/113 B X |
| 3,059,746 | 10/1962 | Christenson | 192/113 B X |
| 3,477,501 | 11/1969 | Van Es | 165/103 |
| 3,561,367 | 2/1971 | Black et al. | 192/85 AA X |
| 3,638,773 | 7/1972 | Lewis et al. | 192/113 B X |
| 3,800,930 | 4/1974 | Sommer | 192/104 F |
| 3,833,100 | 9/1974 | Aschauer | 192/85 AA X |
| 3,834,502 | 9/1974 | Sommer | 192/104 F |
| 3,851,742 | 12/1974 | Sommer | 192/104 F |
| 3,949,844 | 4/1976 | Larson et al. | 192/113 B X |
| 4,280,609 | 7/1981 | Cruise | 192/113 B |
| 4,291,750 | 9/1981 | Cline et al. | 165/35 |
| 4,321,990 | 3/1982 | Koch, Jr. | 192/113 B X |

FOREIGN PATENT DOCUMENTS

| 643678 | 9/1934 | Fed. Rep. of Germany | 192/85 AA |
|---|---|---|---|
| 1034287 | 7/1953 | France | 165/103 |
| 1093488 | 5/1955 | France | 192/85 AA |
| 910162 | 11/1962 | United Kingdom | 192/85 AA |

*Primary Examiner*—Rodney H. Bonck
*Assistant Examiner*—David D. House
*Attorney, Agent, or Firm*—Harness, Dickey & Pierce

[57] ABSTRACT

A variable speed drive unit having a clutch disc stack including input and output shafts, a first series of drive plates located in a fluid reservoir and supported for rotation by a rotatable housing of the unit rotated by one of said shafts, a second series of driven discs interleaved with the drive plates and supported for rotation with the other of said shafts, a piston slideably movable in a piston chamber located at one end of the interleaved plates and discs and adapted to compressively engage the interleaved plates and discs, and a control for the piston providing a gradually increasing rated profile without the need for electronic back-up or extraneous controls. The control includes a two position input flow control and a fixed output flow control, comprising a series of plugs, which output control can be selectively varied between operations of the unit to provide alternate rate profiles for engagement and disengagement of the input and output shafts of the unit.

16 Claims, 4 Drawing Figures

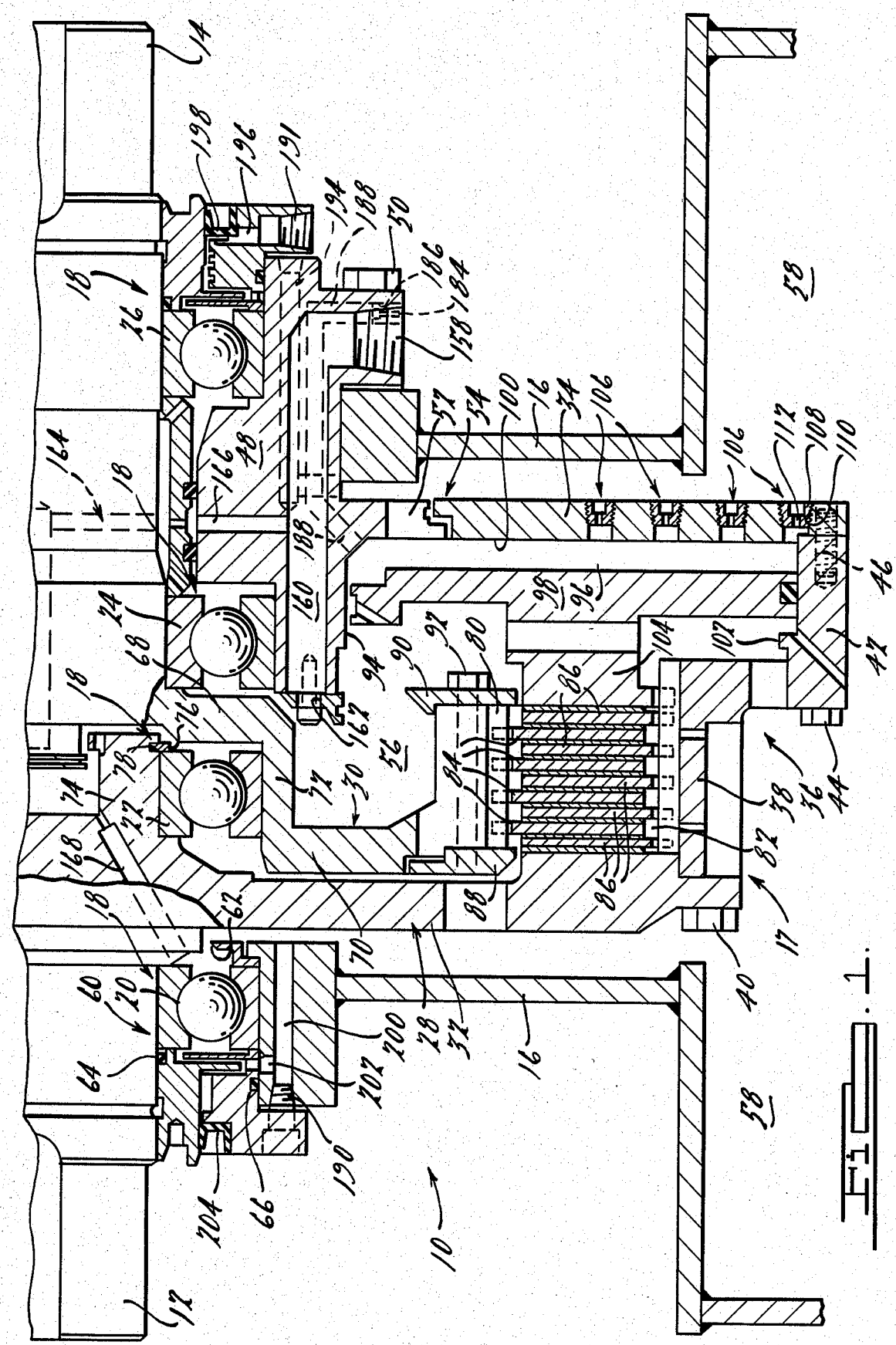

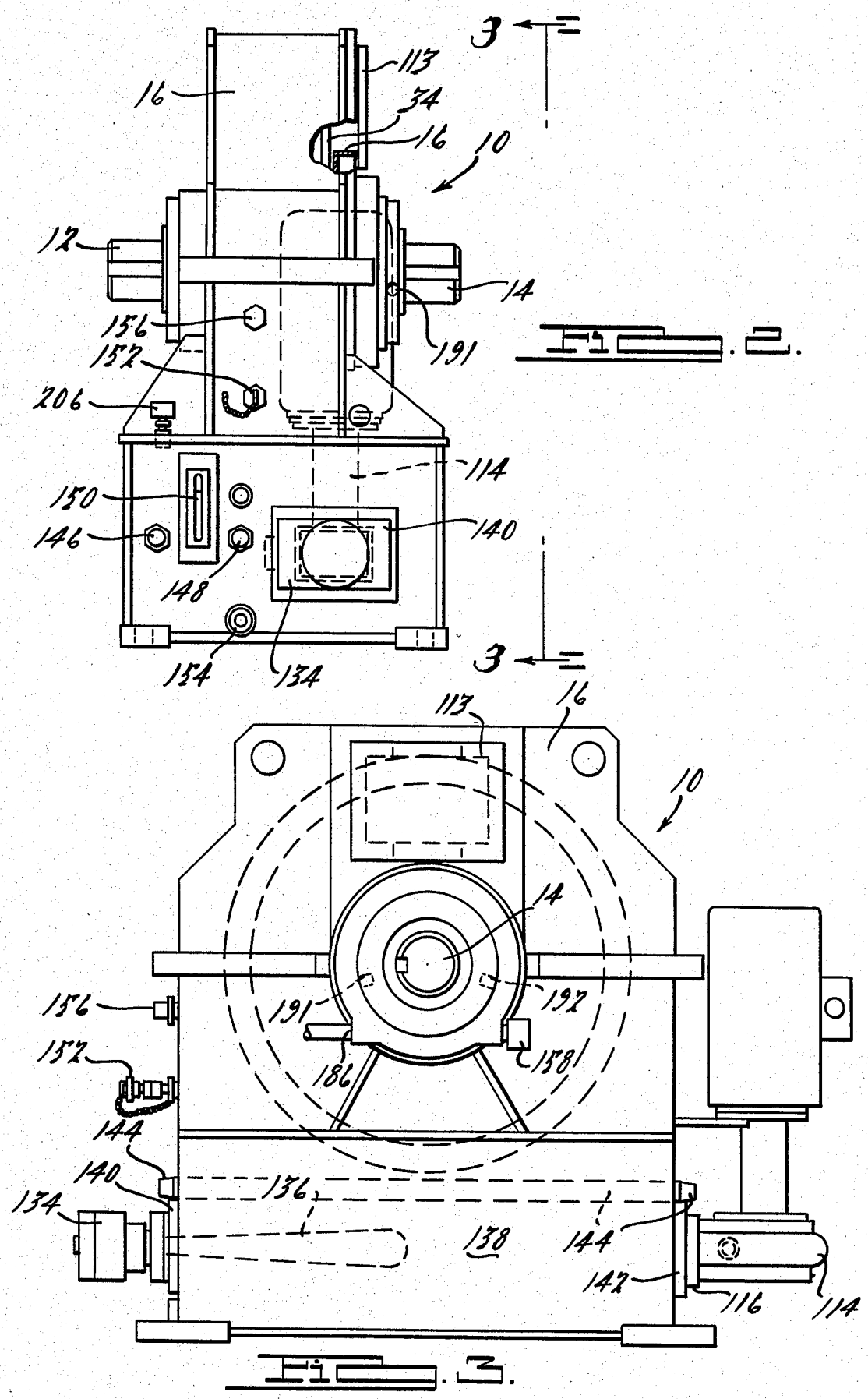

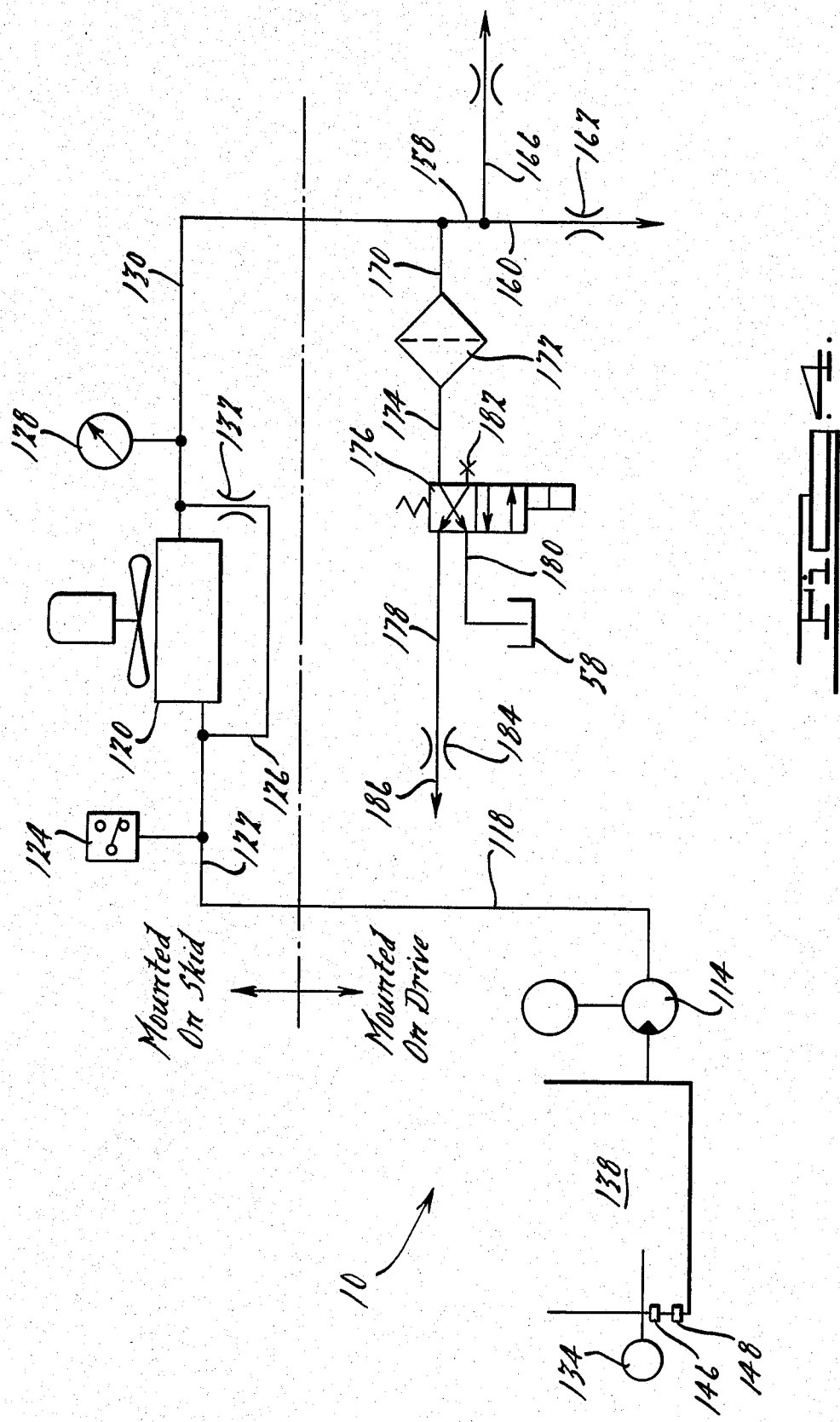

VARIABLE SPEED DRIVE UNIT WITH GRADUATED INCREASING AND DECREASING SPEED PROFILE

This is a continuation of application Ser. No. 327,716, filed Dec. 4, 1981, now abandoned.

BACKGROUND AND SUMMARY OF THE INVENTION

The present invention relates to a variable speed drive unit and more particularly to a variable speed driving having a box type clutch for conveyor drives or the like having input and output shafts, a clutch disc stack including a first series of drive plates located in a fluid reservoir and supported for rotation by a rotatable housing rotated by one of the shafts and a second series of driven discs interleaved with the drive plates and supported for rotation with the other of the shafts, and a piston actuator slideably located at one end of the clutch disc stack and adapted to compressively engage the clutch disc stack.

Conventional variable speed drive units have a small clutch, a stepping motor, and a control panel controlling the stepping motor, the motor and control panel comprising approximately 75 percent of the cost of the unit. The present invention has the object of providing a variable speed drive unit which needs no back-up such as a costly stepping motor and control unit. Another object is to provide such a unit which provides a variable speed drive unit having a self-controlling drive profile without the need for electronic back-up or extraneous controls. A further object is to provide this drive profile as a ramp or having a gradually increasing rate profile.

Universality in use as a drive unit in various types of applications and simplicity in operation make a drive unit much more valuable in the art than a unit having only one specific application. Thus, it is yet another object of the present invention to provide the above objects in a universal and relatively simple to operate construction.

It is another object of the present invention to maintain a positive pressure in the oil system and particularly the interior chambers which comprise a large part of the volume of the oil system to facilitate the movement of the oil whether it is hot or cold.

In some applications, it is desirable to run the oil pump constantly to filter the oil whether the machine is down or in operation. A further object of the present invention is to permit the oil pump to run constantly, but also include an optional bypass around the heat exchanger to permit the use of a smaller heat exchanger for a selected oil pressure.

A further object is to provide the variable speed drive unit of the present invention having a centrifugal pump driving the oil and which can be interchangeably positioned with the heat exchanger. The position of the pump and heat exchanger would depend upon the position of the drive unit desired in the application utilized.

Other objects and advantages of the instant invention will be apparent in the following specification, claims and drawings.

BRIEF DESCRIPTION OF THE DRAWINGS

FIG. 1 is a half cross sectional view of a variable speed drive unit embodying the principles of the present invention;

FIG. 2 is a side elevational view of the variable speed drive unit of FIG. 1;

FIG. 3 is an end elevational view of the variable speed drive unit of FIG. 2 in the direction 3—3; and FIG. 4 is a schematic diagram illustrating the oil flow into and out of the variable speed drive unit of the present invention, including a pump and a heat exchanger.

DESCRIPTION OF THE PREFERRED EMBODIMENT

With reference to FIGS. 2 and 3 of the drawings and in accordance with a preferred embodiment of the subject invention, a variable speed drive unit is indicated generally at 10, having a drive shaft 12 capable of being mounted to a constant speed drive means (not shown) such as an electric motor or the like and having a driven shaft 14 mountable to an associated machine (not shown). The associated machine, by way of example, can include such devices as extruders, conveyors, pumps, fans, mixers, or any other driven machine that utilizes variable speed. As shall hereinafter become apparent, the variable speed drive unit 10 is adapted to selectively convert the constant rotary motion of the motor drive shaft 12 to a reduced variable speed range for the driven shaft 14 to suit the individual requirements thereof. Connector means between the shafts 12 and 14 and the components selected to be attached thereto are known in the art and will not be discussed herein.

A main housing 16 completely encloses the rotatable clutch assembly 17 (FIG. 1). The input 12 and output 14 shafts are rotatably supported within the main housing 16 by an interrelated bearing support system 18 supporting four bearings 20, 22, 24, and 26 around the shafts 12 and 14. Two bearings 20 and 22 are associated with the input shaft 12 and two bearings 24 and 26 support the output shaft, bearing 22 actually extending between the shafts 12 and 14 as will be described later.

Two rotatable housing structures 28 and 30 extend radially from the shafts 12 and 14, respectively, within the main housing 16. The input shaft housing 28 is comprised of two radially extending end walls 32 and 34 axially spaced from one another and interconnected at the radially outer extremes thereof by a two piece annular skirt section 36 comprising, in cross section, a first L-shaped member 38 bolted to end wall 32 at circumferentially spaced intervals by bolts 40 and a second member 42 spaced radially and axially from first member 38 and fixedly secured to both first member 38 by circumferentially spaced bolts 44 and end wall 34 by circumferentially spaced set screws 46. A porting annulus 48 is fixedly secured by circumferentially spaced bolts 50 to the main housing 16 around the output shaft 14. The annulus 48 has a radially extending flange 52 which mates with end wall 34 to form a labyrinth seal 54 and close off the interior of the main housing into two chambers, a working chamber 56 and a reservoir chamber 58. The porting annulus 48 also has means forming the portion of the bearing support system 18 supporting bearings 24 and 26 around the output shaft 14. The input shaft 12 is directly supported by the main housing 16 via bearing 20 held in place by sealed bearing assembly 60 including an annular seal 62 and two O-ring seals 64 and 66.

The output shaft housing 30 is comprised of an annular radially extending flange portion 68 and a C-shaped annular skirt portion 70 extending axially and radially outwardly from the flange portion 68. Output shaft housing 30 is disposed entirely within the working chamber 56. The radially inner, axially extending flange 72 of the housing 30 also comprises a portion of the bearing support system 18 for bearing 22 as referred to above. The input shaft 12 has an annular axially extending flange 74 at one axial extreme thereof upon which bearing 22 is disposed and held in place by snap ring 76 in groove 78. In this manner, the output shaft 14 through flange 72 is used to support the input shaft 12 in an interrelated fashion through bearing 22.

The outer periphery of the annular C-shaped section 70 of the output housing 30 and the inner periphery of the annular L-shaped member 38 of input housing 28 each have axially extending splines 80 and 82 respectively at circumferentially spaced intervals. The splines 80 of housing 30 are adapted to slideably receive a series of internally bored clutch drive plates 84. The plates 84 are each provided with a plurality of circumferentially spaced, radially inwardly extending notches adapted for splined engagement with the plurality of splines 80. Similarly, a series of friction discs 86 are interleaved with each of the drive plates 84 and carried by the splines 82 formed on the inner periphery of member 38 of input housing 28. Retainer means comprising annular retainer members 88 and 90 and bolts 92 disposed at circumferentially spaced locations thereof loosely retain the interleaved disposition of the plates 84 and the discs 86 and retain the plates 84 on the output housing 30 throughout the operation of the unit 10.

End wall 34, member 42, flange 52, and the radially outer surface 94 of the portion of the porting annulus 48 extending into the working chamber 56 form a subchamber 96 in which an annular piston 98 moves axially between the surface 100 formed by the end wall 34 and flange 52 and a radially inwardly extending abutment flange 102 extending from member 42. The piston 98 has an annular driving piston head 104 which when actuated by increased oil pressure in subchamber 96 is forced against the plates 84 and discs 86.

The oil pressure of subchamber 96 which controls the movement of the piston head 104 is determined by a multiplicity of orifice plugs 106 circumferentially and radially spaced at positions about the end wall 34. The number of plugs is determined in accordance with the given torque transmitting capacity of the unit 10. Each plug 106 comprises a threaded body portion 108 threadable into a bore 110 in the end wall 34. The body portion 108 of each plug 106 includes an orifice 112 through which oil can pass from subchamber 96 to the reservoir chamber 58. The plugs 106 can be arranged and rearranged between orificed and non-orificed plugs by removal of the cover plate 113 (FIGS. 2 and 3) for ready access to the plugs. It should be noted that the housing wall 16 is designed to be near enough to end wall 34 not to allow any plugs to fall into the machine when they are threadably disengaged.

In the present invention, a hydraulic fluid media is directed across the radial abutting surfaces of each of the drive plates 84 and friction discs 86 to maintain a positive oil film on each of the plates 84 and discs 86 which is subject to be viscously sheared whereby a controlled slippage, and a correspondingly reduced rotary motion to the output shaft 14 can be achieved by controlling the loading of the pressure between adjacent plates 84 and 86 as applied by the head portion 104 of the piston 98. The control of the movement of the piston 98 in the present invention is controlled completely within the system, as shall hereinafter be described, with no electronic input or control of any kind as previously utilized by prior art units.

As best illustrated in FIGS. 2 and 3, a centrifugal pump 114 is fixedly secured to the main housing 16 having an inlet port 116 below the oil level in the outer chamber 58 of the unit. The pump 114 is preferably of the centrifugal dual intake type as manufactured by Rutman Mfg. Co. and identified as a "Gusher" Pump, Model No. 11022-E, having two horsepower at 3460 r.p.m. (230/460 volts, three phase, with impeller #2292H). The pump output 118 is directed, as illustrated schematically by FIG. 4, into an ancillary heat exchanger 120 via conduit 122 through a pressure limit switch 124. A bypass conduit 126 is also included in order to use a smaller heat exchanger without having a prohibitive pressure drop. A pressure gauge 128 is included in the system to monitor the pressure drop through the heat exchanger 120 (22H, 1/2 h.p., 170 r.p.m.) to apprise the operator that sufficient operating pressure exists in the oil line or conduit 130 beyond the heat exchanger 120 as the line enters the drive unit 10. In the preferred embodiment, the pump 114 pumps 35 gpm at approximately 32 p.s.i. (at which the limit switch 124 is set) into the heat exchanger 120. The bypass flow around the heat exchanger 120 through the bypass conduit 126 is approximately 11 gpm as set by a 13/32 orifice 132. The oil is at an approximate pressure of 25 p.s.i. in the line 130 entering the drive unit 10, a pressure drop of only 7 p.s.i. across the heat exchanger 120.

A heater (1.5 kw, 480 volts) 134 is also mounted on the opposite side of the housing 16 from the pump 114 with its heating element 136 disposed in the oil reservoir 138 of the main chamber 58. The mount 140 for the heater 134 is identical to the mount 142 for the inlet port 116 of the pump 114 so that the pump 114 and heater 134 may be interchanged as space considerations externally around the unit permit or as otherwise desired. A cross wiring conduit 144 is disposed through the housing 16 to add to the ease of interchangeability of the pump 114 and heater 134 and provide the option of presenting the power wires to the unit 10 only from one side of the unit without exterior crossover.

In the subject invention, high limit 146 and low limit 148 temperature switches are included to control the heater 134. The housing 16, as illustrated in FIG. 2, also includes an oil level sight 150, a covered quick connect stem oil fill 152, an oil drain 154, and a cooling oil over temperature switch 156, as shown.

Oil from conduit 130 enters the drive unit 10 and breaks off in one direction to inlet port 158 of the porting annulus 48 (FIGS. 1 and 3). Referring now to FIGS. 1 and 3, the porting annulus 48 is utilized to convey hydraulic fluid from the inlet port 158 into the working chamber 56 and to the bearings 20, 22, 24, and 26 via the output shaft 14 and the input shaft 12. The inlet passageway 160 of the porting annulus 48 directs hydraulic fluid to two positions. The passageway 160 directly feeds orifice 162 into working chamber 56 to supply oil to the plates 84 and discs 86 and also to bearing 24. Passageway 160 also feeds into the output shaft lubricating system 164 via radial passageway 166 to lubricate bearings 26 and 22, and, via input shaft lubricating system 168, bearing 20.

Alternatively, the inlet port 158 may be bored axially through the input shaft 12 and communicate with the working chamber 56 radially outwardly of the discs via a passageway (not shown) that would be formed in end wall 32 and member 38.

Conduit 130 also breaks off in a second direction to supply oil to the piston subchamber 96. Conduit 130 branches into conduit 170 which feeds oil through a 15 micron filter 172 to conduit 174 which communicates with a four-way single acting spring return solenoid valve 176. The valve 176 is the primary control for the operation of the unit 10. The four positions of the valve 176 are conduits 174, 178, and 180, and a plug 182. Conduit 178 communicates with orifice 184 and inlet port 186 in the porting annulus 48 to feed oil to the piston subchamber 96 via passageway 188. Conduit 180 communicates as a drain to return oil to the reservoir chamber 58.

When the valve 176 is in the at rest position illustrated by FIG. 4, oil passes through the filter 172 and is returned directly to the reservoir 58. After the valve 176 is activated to the operating position (not shown), conduit 174 communicates with conduit 178, which in turn feeds oil under pressure to subchamber 96. This oil forces the piston 98 toward the plates 84 and discs 86 to engage the drive shaft 12 to driven shaft 14 and drive the machine associated with driven shaft 14. The oil in subchamber 96 is also bleeding through the orifices 112 back into the reservoir 58 at a selected rate such that the engagement of the shafts 12 and 14 occurs as a ramp or gradually increasing rate profile until a steady state is attained in subchamber 96 between the flow rates in and out.

Return of the valve 176 to the at rest position (as shown) stop the flow into subchamber 96 while oil continues to bleed through the orifice 112. The oil pressure in working chamber 56 forces the piston 98 out of engagement with the plates 84 and discs 86, again at a gradual rate or ramp rate, until the shafts are once again disengaged as the plates 84 and discs 86 become further spaced apart.

An additional feature of the present invention is the maintenance of a positive pressure (above atmospheric) in the oil system. This positive pressure is accomplished by injecting pressurized air (above atmospheric) into the oil system through the oil reservoir 58 via air inlets 190, 191, and 192 (inlet 191 is out of position in FIG. 1 for purposes of clarity; see FIGS. 2 and 5 for proper location). The pressurized air communicates with various parts of the oil system. Referring to FIG. 1, air from inlet 191 enters the oil reservoir 58 directly via passageway 194 and also positively pressurizes the oil system at bearing 26 via passageway 196. The pressure at bearing 26 at the portions of the oil system communicating with bearing 26 is further maintained by utilizing an O-ring seal 198 at the housing-bearing interface adjacent the bearing 26. Air from inlet 192 enters the oil system in an identical manner.

Pressurized air also enters the oil system from air inlet 190 via passageway 200 directly into the oil reservoir 58 and via passageway 202 to the bearing 20 to positively pressurize the oil system at bearing 20 and the portions of the oil system communicating with the bearing 20. Again an O-ring seal 204 is used to further maintain pressure in the oil system.

A pressurized oil system is particularly advantageous in the present invention where oil controls the piston, lubricates all the moving parts and also engages the plates and the discs by a shearing action. With a positive pressure in the oil system, the status of the unit (hot or cold) will not become as critical to the performance of the unit as in the past. Breathers 206 are also included which along with the seals 198 and 204 will release air from the oil system as the pressure rises above a desired level during the operation of the unit 10.

Thus there is disclosed in the above description and in the drawings an improved variable speed drive unit which fully and effectively accomplishes the objectives of the present invention. However, it will be apparent that variations and modifications of the disclosed embodiments may be made without departing from the principle of the invention or the scope of the appended claims.

What is claimed is:

1. An improved variable speed drive unit comprising an external housing, input and output shafts, a fluid reservoir, a rotatable housing secured to one of said shafts, clutch disc stack means including a first series of plates located in said fluid reservoir and supported for rotation by said rotatable housing and a second series of discs interleaved with the plates and supported for rotation with the other of said shafts, having the improvement of:

a piston chamber disposed within said external housing having a chamber end wall extending across one end thereof, said chamber end wall having a plurality of apertures therein;

a piston movably disposed in said piston chamber at one end of said clutch disc stack means for compressively engaging said plates and discs together;

actuator means for controlling the movement of said piston comprising:

two position actuator input means having a first portion wherein fluid is directed into said piston chamber and a second position wherein fluid is restricted from entering said piston chamber; and actuator output means from said piston chamber, having one selected flow rate during operation of said unit comprised of a system of removable and replaceable plugs disposable in said apertures in said chamber end wall for varying said selected flow rate to a different flow rate while said piston means, piston chamber and input actuator means remain intact in said unit within said housing;

wherein said actuator means controls the piston means to actuate the unit in a graduated profile which profile can be varied as desired between operations of the unit by said operator by placement or removal of said removable and replaceable system plugs.

2. A claim in accordance with claim 1, wherein said plugs are orificed plugs.

3. A claim in accordance with claim 2, wherein said plugs are threadably removable.

4. A claim in accordance with claim 1, further comprising means for pressurizing said reservoir above atmosphere pressure.

5. A claim in accordance with claim 4, wherein said means for pressurizing said reservoir comprises means for injecting pressurized air into said reservoir.

6. A claim in accordance with claim 1 wherein said plugs include orificed and non-orificed plugs.

7. A claim in accordance with claim 1, wherein said plugs are circumferentially spaced.

8. A claim in accordance with claim 1, wherein said plugs are radially spaced.

9. An improved variable speed drive unit comprising:
an external housing including a fluid reservoir;
input and output shafts;
a rotatable housing secured to one of said shafts;

a fluid working chamber disposed within said rotatable housing;

a first series of plates located within said working chamber and supported for rotation by said rotatable housing;

a second series of discs interleaved with said plates and supported for rotation with the other of said shafts;

a piston chamber disposed within said external housing having a wall extending across one end thereof;

piston means movably disposed in said piston chamber at one end of said interleaved plates and discs for compressively engaging said plates and discs together, the other end of said piston means slideably disposed to move toward and away from said chamber wall and capable of moving through the volume of said chamber from a first position away from said chamber wall to a second position up to said chamber wall;

valving means to said piston chamber, including means for controlling the flow of fluid into said piston chamber having a first position wherein fluid flows into said chamber and a second position stopping fluid from entering said chamber;

means for discharging fluid from said piston chamber at a selectively fixed flow rate; and means for varying said flow rate as desired between operations of said unit, comprising a series of removable and replaceable interchangeable plugs selectively installed within, removed from, and interchangeable within said chamber wall for discharging fluid from said piston chamber wherein said flow rate can be varied by interchange, removal, or replacement of said plugs.

10. A claim in accordance with claim 9, further comprising fluid pumping means, bearing means for all rotating parts of the unit, and means for distributing fluid to said bearing means, rotatable housing working chamber, and piston chamber, said distributing means including orifice control means.

11. A claim in accordance with claim 10, wherein said pumping means comprises centrifugal pumping means.

12. A claim in accordance with claim 9, further comprising means for injecting pressurized air into said fluid reservoir to maintain a pressure above atmosphere therein.

13. An improved variable speed drive unit comprising an external housing, input and output shafts, a fluid reservoir, a rotatable housing secured to one of said shafts, clutch disc stack means including a first series of plates located in said fluid reservoir and supported for rotation by said rotatable housing and a second series of discs interleaved with the plates and supported for rotation with the other of said shafts, having the improvement of:

a piston for engaging said plates and discs movable in a chamber, said piston having a working surface acting against fluid disposed in said chamber;

control means for said piston comprising input means having a first position providing fluid flow to said working surface of said piston and a second position providing no fluid flow to said working surface of said piston, and output means having a fixed discharge flow rate during operation of said unit; and a system for varying said fixed discharge flow rate while also permitting said piston to traverse the interior volume of said chamber comprising removable and replaceable interchangeable plugs for varying said flow rate, means for accessing said plugs with said means for engaging and control means intact, and manually engageable means for interchanging said interchangeable plugs accessible from the exterior of said external housing through said accessing means wherein removal or interchange of the plugs can vary said flow rate.

14. A claim in accordance with claim 13, further comprising means for pumping fluid, heat exchanger means, conduit means connecting said unit, pumping means and heat exchanger means together, and means for partially bypassing the flow through said conduit means around said heat exchanger means.

15. A claim in accordance with claim 12, further comprising filter means between said heat exchanger and said unit, wherein said pumping means is run constantly and said fluid is filtered through said filter means, even when said input means is disposed in said second position.

16. An improved variable speed drive unit comprising an external housing, input and output shafts, a fluid reservoir, a rotatable housing secured to one of said shafts, clutch disc stack means including a first series of plates located in said fluid reservoir and supported for rotation by said rotatable housing and a second series of discs interleaved with the plates and supported for rotation with the other of said shafts, having the improvement of:

means for engaging said plates and discs; and control means for said engaging means including input means having a first position providing fluid flow to said engaging means and a second position providing no fluid flow to said engaging means and output means including a plurality of apertures and having one selected discharge flow rate during operation of said unit, including means for selectively varying said discharge flow rate after the completion of one operation of the unit and before a subsequent operation of the unit, comprising a series of orificed and non-orificed plugs disposeable in said plurality of apertures and interchangeable to provide a variety of ramp actuation profiles as selectively desired during operations of said unit, wherein said plugs are removeable and interchangeable while said engaging means remains intact within said housing.

* * * * *

UNITED STATES PATENT AND TRADEMARK OFFICE
CERTIFICATE OF CORRECTION

PATENT NO. : 4,527,681

DATED : July 9, 1985

INVENTOR(S) : Gordon M. Sommer

It is certified that error appears in the above-identified patent and that said Letters Patent is hereby corrected as shown below:

Col. 1, line 13, "driving" should be --drive--

Col. 5, line 31, "orifice" should be --orifices--

Col. 5, line 43, "5" should be --3--

Col. 6, line 32, "portion" should be --position--

Signed and Sealed this

Thirtieth Day of September 1986

[SEAL]

Attest:

DONALD J. QUIGG

Attesting Officer

Commissioner of Patents and Trademarks